(No Model.)
M. A. MICHALES.
RAIL BRAKE.
No. 401,755. Patented Apr. 23, 1889.
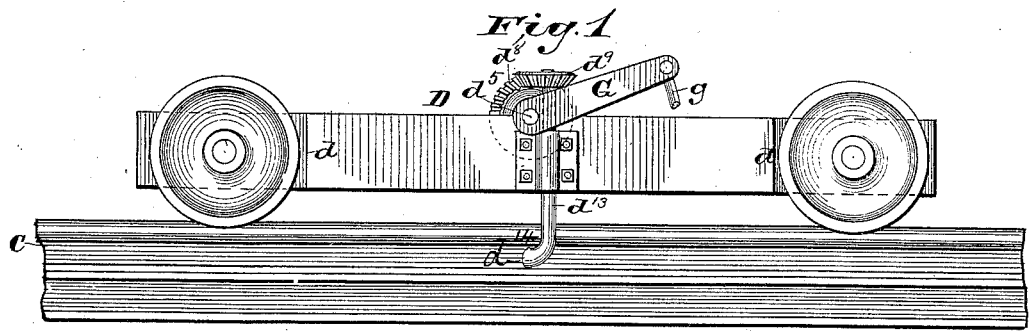
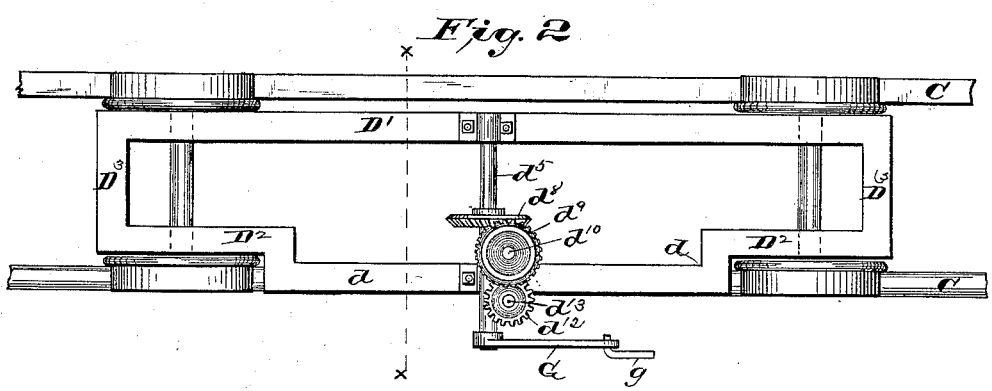
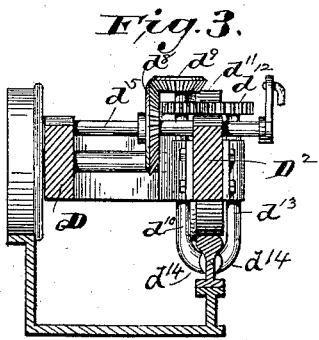
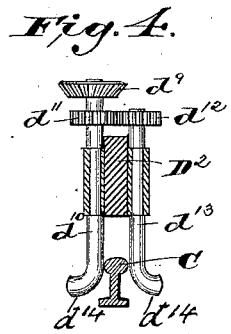
Witnesses:
E. J. Walker
Edwin S. Clarkson
Inventor
Moses A. Michales
by F. W. Ritter, Jr.
Atty

UNITED STATES PATENT OFFICE.

MOSES A. MICHALES, OF ALLEGHENY, ASSIGNOR OF ONE-HALF TO JOHN T. MOORE, OF PITTSBURG, PENNSYLVANIA.

RAIL-BRAKE.

SPECIFICATION forming part of Letters Patent No. 401,755, dated April 23, 1889.

Original application filed May 15, 1888, Serial No. 273,951. Divided and this application filed July 10, 1888. Serial No. 279,514.

(No model.)

*To all whom it may concern:*

Be it known that I, MOSES A. MICHALES, a citizen of the United States, residing at Allegheny, in the county of Allegheny and State of Pennsylvania, have invented certain new and useful Improvements in Rail-Brakes for Cars; and I hereby declare the following to be a full, clear, and exact description of the same, reference being had to the accompanying drawings, wherein—

Figure 1 is an elevation of a portion of railway-track and a truck having applied thereto a rail-brake embodying my invention. Fig. 2 is a plan or top view of the same. Fig. 3 is a vertical transverse section on the line $x\ x$, Fig. 2, looking in the direction of the arrow. Fig. 4 is a detached view of the rail-brake.

Like letters refer to like parts wherever they occur.

The present invention is a division of application, Serial No. 273,951, filed May 15, 1888, which relates more especially to the construction of tracks and trucks for elevated railways, and is intended to cover all such features of construction of the brake therein shown and described (but not claimed) as are of general utility in any railway system.

The first feature of invention consists in the combination, with the truck-sill, of two parallel shafts journaled thereon in line with and between the wheels and having cranked extremities adapted to grip the track-rail.

The second feature thereon consists in providing said truck-sill with an offset or bracket, whereby the parallel journaled shafts are caused to straddle the track-rail in line with and between the wheels; and the third feature consists in providing the parallel journaled shafts of the grip-brake with skew-gearing, whereby a transverse shaft may be utilized to operate the brake, thus especially fitting the devices for use on overhead trucks for suspended cars.

I will now proceed to describe my invention more specifically, so that others skilled in the art to which it appertains may apply the same.

In the drawings, C C indicate the rails of a track, and D a truck having wheels adapted for the class of track with which it is used. The truck D has its side sills, D′ D², and end sills, D³. One of the side sills—as, for instance, the sill D²—should have angular bends or offsets $d\ d$, so as to form a support or bearing for the brake between the wheels of the truck over and in line with the track-rail C. In lieu thereof a suitable bracket may be secured to the side sill of the truck D. On the upper faces of the side sills, D′ D², of the truck are secured journal-boxes, in which is mounted a transverse shaft, $d^5$, provided with a crank-arm, G, connected by means of a rod, $g$, with a lever having its fulcrum on the car-platform and which serves to rock or partially rotate the shaft $d^5$. On the shaft $d^5$ is keyed a bevel skew-gear, $d^8$, which meshes with a similar gear, $d^9$, keyed to a vertical brake-shaft, $d^{10}$, journaled in a bearing secured to the inner face of side sill, D². This brake-shaft $d^{10}$ is also fitted with a pinion, $d^{11}$, rigidly secured thereto, which meshes with a similar pinion, $d^{12}$, keyed on another vertical shaft, $d^{13}$, arranged parallel with the first brake-shaft, $d^{10}$, and journaled in a suitable bearing bolted or otherwise secured to the outer face of side sill, D². The lower ends of these brake-shafts $d^{10}$ and $d^{13}$ are cranked or bent rearwardly, as at $d^{14}$, which bent portions are designed to grasp or be brought in frictional contact with the web of the rail C by the rotation of vertical brake-shafts $d^{10}$ and $d^{13}$, and it is to afford facility for this construction and operation of the brake mechanism that the side sill, D², of the truck is provided with the bends or offsets $d\ d$. If found necessary, sleeves or equivalent shoes (not shown) may be used with the crank ends $d^{14}$ of said shafts.

The devices being constructed substantially as before specified, will operate as follows: By means of an operating-lever having its fulcrum on the car-platform through the medium of rod $g$ and crank-arm, G, the shaft $d^5$ is rotated, communicating motion through the skew-gearing $d^8\ d^9$ and pinions $d^{11}$ and $d^{12}$ to the parallel rotating brake-shafts $d^{10}$ and $d^{13}$, thus causing the shafts to rotate and the brake-shoes to grip or grasp the web of rail C with frictional contact. A reverse motion imparted to the crank-arm G will release the rail-brake.

Having thus described the nature and operation of my invention, what I claim, and desire to secure by Letters Patent, is—

1. In a rail-brake, the combination, with the truck-sill, of two parallel journaled brake-shafts having crank-arms arranged between the wheels of the truck in line therewith and adapted to grip the track-rail, substantially as and for the purposes specified.

2. The combination, in a rail-brake, of two parallel journaled brake-shafts provided with pinions, and a bevel skew-gearing, substantially as and for the purposes specified.

3. The combination, with a truck one of whose sills has an offset or bracket arranged between the wheels, of two parallel brake-shafts journaled on said bracket of the side sill, and mechanism for rotating the parallel journaled brake-shafts, substantially as and for the purposes specified.

In testimony whereof I affix my signature, in presence of two witnesses, this 7th day of July, 1888.

MOSES A. MICHALES.

Witnesses:
JNO. B. DIAMOND,
CHARLES LARGE.